(12) United States Patent
Wernig et al.

(10) Patent No.: US 7,903,413 B1
(45) Date of Patent: Mar. 8, 2011

(54) COUPLING SYSTEM AND METHOD FOR ATTACHING THERMAL COMPONENTS IN ASSOCIATION WITH A BOARD-MOUNTED INTEGRATED CIRCUIT

(75) Inventors: Glenn A. Wernig, San Jose, CA (US); Ryan C. Tong, Palo Alto, CA (US); Charles E. Buffington, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 138 days.

(21) Appl. No.: 11/770,632

(22) Filed: Jun. 28, 2007

(51) Int. Cl.
*H05K 7/20* (2006.01)
*F28F 7/00* (2006.01)
*H01B 9/06* (2006.01)
*H01L 23/34* (2006.01)

(52) U.S. Cl. ......... 361/709; 361/704; 361/710; 361/719; 165/80.3; 165/185; 174/16.3; 257/718; 257/719; 257/722

(58) Field of Classification Search .......... 361/704, 361/709, 710, 711, 718, 719, 697; 165/80.2–80.3, 165/185; 174/15.1, 16.1, 16.3; 257/718, 257/719, 722
See application file for complete search history.

(56) References Cited

U.S. PATENT DOCUMENTS

| | | | | |
|---|---|---|---|---|
| 5,304,735 A * | 4/1994 | Earl et al. | 174/16.3 |
| 6,109,340 A * | 8/2000 | Nakase et al. | 165/80.3 |
| 6,396,693 B1 * | 5/2002 | Shih | 361/703 |
| 6,396,695 B1 * | 5/2002 | Lee et al. | 361/704 |
| 6,452,804 B1 * | 9/2002 | Dibene et al. | 361/720 |
| 6,470,962 B1 * | 10/2002 | Pao | 165/80.3 |
| 6,519,155 B1 * | 2/2003 | Walkup | 361/704 |
| 2006/0023423 A1 * | 2/2006 | Kuo et al. | 361/697 |
| 2006/0120051 A1 * | 6/2006 | Macris et al. | 361/704 |

OTHER PUBLICATIONS

U.S. Appl. No. 60/869,590, filed Dec. 12, 2006.

* cited by examiner

*Primary Examiner* — Zachary M Pape
(74) *Attorney, Agent, or Firm* — Zilka-Kotab, PC (57) ABSTRACT

A system and method are provided including a first thermal component adapted for thermal communication with an integrated circuit, and a second thermal component adapted for thermal communication with the first thermal component upon engagement therewith. Further provided is a coupler slidably coupled to the first thermal component and/or the second thermal component. In use, such coupler is capable of a first orientation for disengaging, the first thermal component and the second thermal component, and a second orientation for engaging the first thermal component and the second thermal component.

24 Claims, 5 Drawing Sheets

COUPLING SYSTEM AND METHOD FOR ATTACHING THERMAL COMPONENTS IN ASSOCIATION WITH A BOARD-MOUNTED INTEGRATED CIRCUIT

FIELD OF THE INVENTION

The present invention relates to heat exchange systems, and more particularly to integrated circuit heat exchange systems.

BACKGROUND

To date, many mechanical designs have been developed to attach a heat exchanger (e.g. heat dissipater in the form of a heat sink, fan, etc.) to an integrated circuit for the purpose of drawing heat from the integrated circuit, during use. Typically, a first plate is coupled to an underlying circuit board for thermally engaging the integrated circuit. Further, a second plate with an associated heat dissipater is removably engaged with the first plate for allowing thermal communication between the integrated circuit and the heat dissipater.

To maintain engagement of the first plate and the second plate, one or more screws or the like are conventionally used to attach the same. The use of such screws, however, is often cumbersome and further detrimentally contributes to an enlarged system profile. There is thus a need for addressing these and/or other issues associated with the prior art.

SUMMARY

A system and method are provided including, a first thermal component adapted for thermal communication with an integrated circuit, and a second thermal component adapted for thermal communication with the first thermal component upon engagement therewith. Further provided is a coupler slidably coupled to the first thermal component and/or the second thermal component, in use, such coupler is capable of a first orientation for disengaging the first thermal component and the second thermal component, and a second orientation for engaging the first thermal component and the second thermal component.

DETAILED DESCRIPTION

Figure 1:
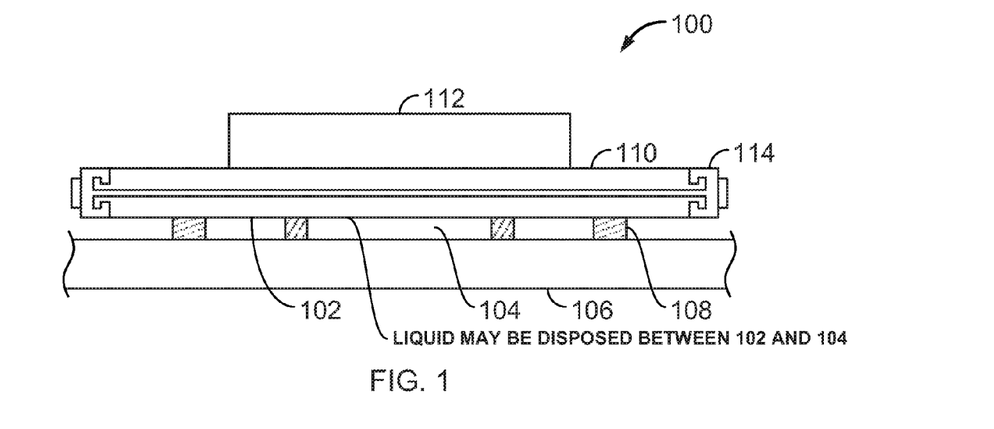
FIG. 1 is a side view of a system for attaching a heat dissipater to an integrated circuit, in accordance with one embodiment.

FIG. 1 is a side view of a system 100 for attaching a heat dissipater to an integrated circuit, in accordance with one embodiment. As shown, included is a first thermal component 102 adapted for thermal communication with an integrated circuit 104. In various embodiments, the integrated circuit 104 may include a central processing unit (CPU), a graphics processor, a network processor, and/or any other integrated circuit, for that matter. Still yet, in one embodiment, the integrated circuit 104 may be coupled to a circuit board 106, in the manner shown.

In the illustrated embodiment, the first thermal component 102 may remain in thermal communication with the integrated circuit 104 by virtue of a plurality of screws 108 which are used to attach the first thermal component 102 to the circuit board 106, as illustrated. Of course, other types of coupling (other than screws) are also contemplated. Strictly as an option, an amount of unillustrated liquid may be disposed between the first thermal component 102 and the integrated, circuit 104 for facilitating the aforementioned thermal communication.

Further included is a second thermal component 110 adapted for thermal communication with the first thermal component 102 upon engagement therewith. In various embodiments, the first thermal component 102 and/or the second thermal component 110 may take the form of plates, as shown. It should be noted, however, that, in other embodiments, the first thermal component 102 and the second thermal component 110 may take other forms, as well. Further, the first thermal component 102 and the second thermal component 110 may be manufactured using any desired material including, but not limited to plastic, ceramic, metal, etc.

With continuing reference to FIG. 1, the second thermal component 110 is equipped with a heat dissipater 112. In various embodiments, the heat dissipater 112 may be integrally or otherwise coupled to the second thermal component 110. In one embodiment, the heat dissipater 112 may be passive in nature. For example, the heat dissipater 112 may include a heat sink, etc. In other embodiments, the heat dissipater 112 may be active in nature. For example, the heat dissipater 112 may include a fan, a liquid-cooling system, etc.

Further provided, is a coupler 114 slidably coupled to the first thermal component 102 and/or the second thermal component 110. As will become more apparent during, the description of subsequent figures, such coupler 114 is capable of being maneuvered in a first orientation for disengaging the first thermal component 102 and the second thermal component 110. Still yet, the coupler 114 may further be capable of being maneuvered in a second orientation for engaging the first thermal component 102 and the second thermal component 110.

By this design, engagement and disengagement of the first thermal component 102 and the second thermal component 110 may be facilitated. For example, in one embodiment, the coupler 114 may allow for such engagement and disengagement of the first thermal component 102 and the second thermal component 110 without necessarily requiring the use of a tool (e.g. screw driver, etc.). Further, in another optional embodiment, the coupler 114 may be designed to facilitate the alignment of the first thermal component 102 and the second thermal component 110 during the engagement.

More illustrative information will now be set forth regarding various optional architectures and features with which the foregoing framework may or may not be implemented, per the desires of the user. Specifically, different embodiments will now be set forth for providing for the control of the two angular dimensions and curvature, as well as various applications that may, in turn, be implemented.

Figure 2:
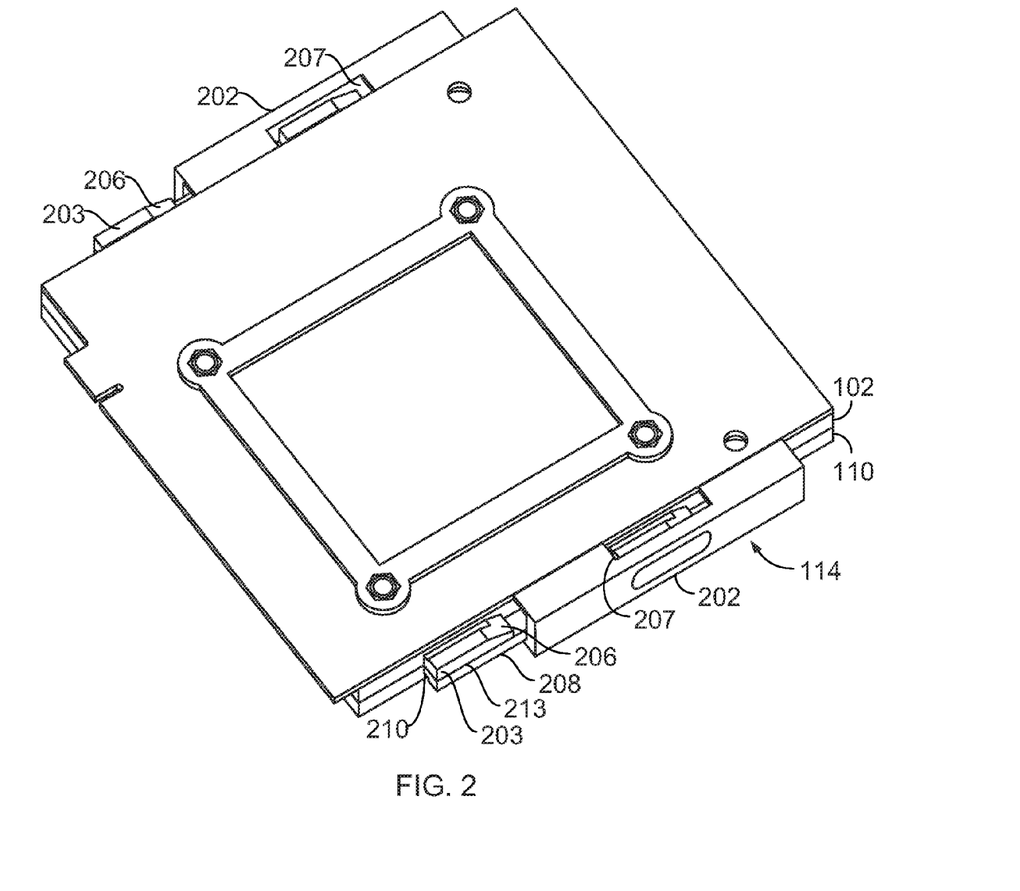
FIG. 2 is a top perspective view of the system of FIG. 1 for attaching a heat dissipater to an integrated circuit, with associated coupling sliders in a disengaged orientation.

FIG. 2 is a top perspective view of the system 100 of FIG. 1 for attaching a heat dissipater to an integrated circuit. As shown, in the present embodiment, the coupler 114 is shown to include a pair of sliders 202 coupled to opposite sides of the first thermal component 102 and the second thermal component for sliding along elongated extensions 208 that extend from opposite sides of the second thermal component 110. While the coupler 114 is shown to take the form of the pair of sliders 202 in the present embodiment, it should be noted that other couplers are envisioned as well that are capable of being slidably maneuvered between the first and second orientations described above. For example, a single member may be used to engage the first thermal component 102 and the second thermal component 110, etc.

For reasons that will soon become apparent, the first thermal component 102 include a pair of tabs 203 extending from opposite sides of the first thermal component 102. Each of such tabs 203 has a first beveled edge 206 formed in an end of the top face thereof.

Still yet, each of the sliders 202 has a slot 207 formed in a top face thereof. As shown, the pair of sliders 202 of the present embodiment are positioned to reside in the above-mentioned second orientation for allowing disengagement of the first thermal component 102 and the second thermal component 110. In such orientation, the tabs 203 of the first thermal component 102 are capable of passing through the slots 207 of the sliders 202 for being engaged within similarly sized recesses 213 formed in a top face of the elongated extensions 208 of the second thermal component 110.

By virtue of the positioning of such tabs 203, recesses 213, and slots 207, the first thermal component 102 and the second thermal component 110 may be self-aligned upon engagement. In particular, by positioning of the tabs 203 of the first thermal component 102 so that they pass through the slots 207 of the sliders 202 and into the recesses 213 of the elongated extensions 208 of the second thermal component 110, the second thermal component 110 is inherently aligned directly above and thus aligned with the first thermal component 102, upon engagement.

To this end, the sliders 202 are capable of slidably engaging the tabs 203 of the first thermal component 102. Specifically, a second beveled edge (not shown) of the sliders 202 may engage the first beveled edge 206 of the respective tab 203 for forcing the first thermal component 102 and the second thermal component 110 into engagement. To guide such sliding movement, the sliders 202 may engage a linear track 210 formed in a bottom face of the elongated extensions 208 of the second thermal component 110.

Figure 3:
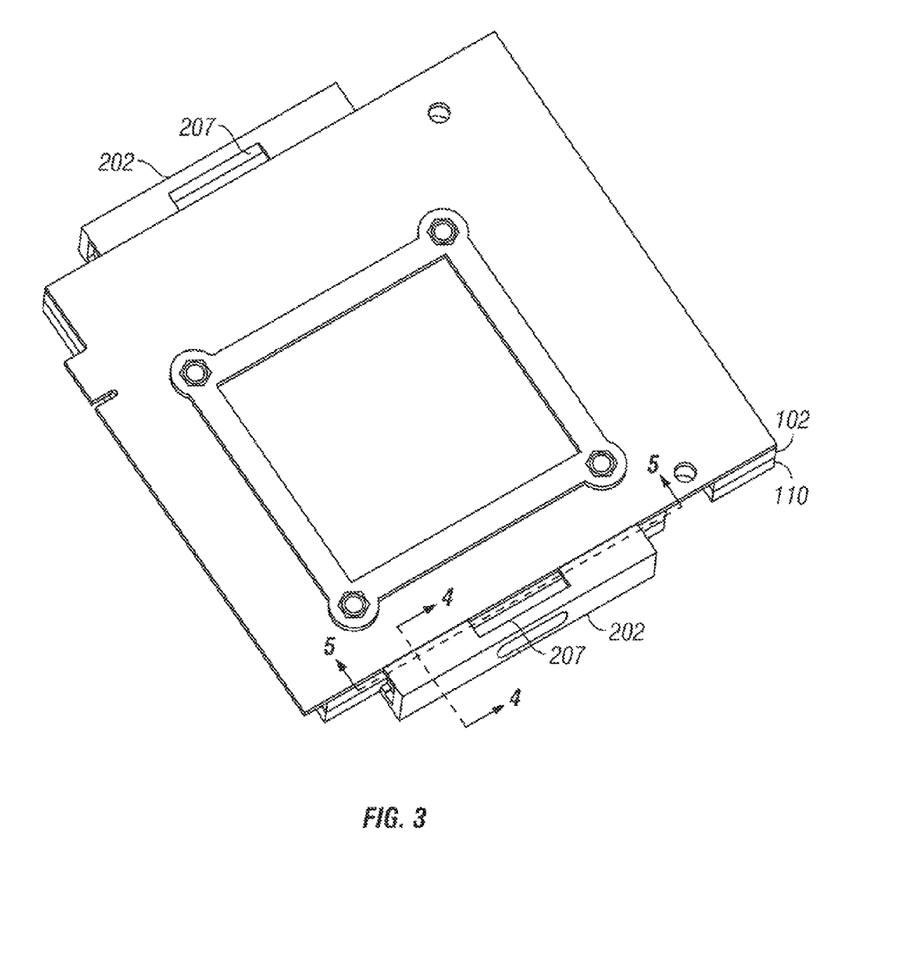
FIG. 3 is a top perspective view of the system of FIG. 1 with the sliders in an engaged orientation.

FIG. 3 is a top perspective view of the system 100 of FIG. 1 with the sliders 202 in an engaged orientation. As illustrated, the sliders encompass the tabs 203 upon engagement, for precluding the separation of the first thermal component 102 and the second thermal component 110.

Figure 4:
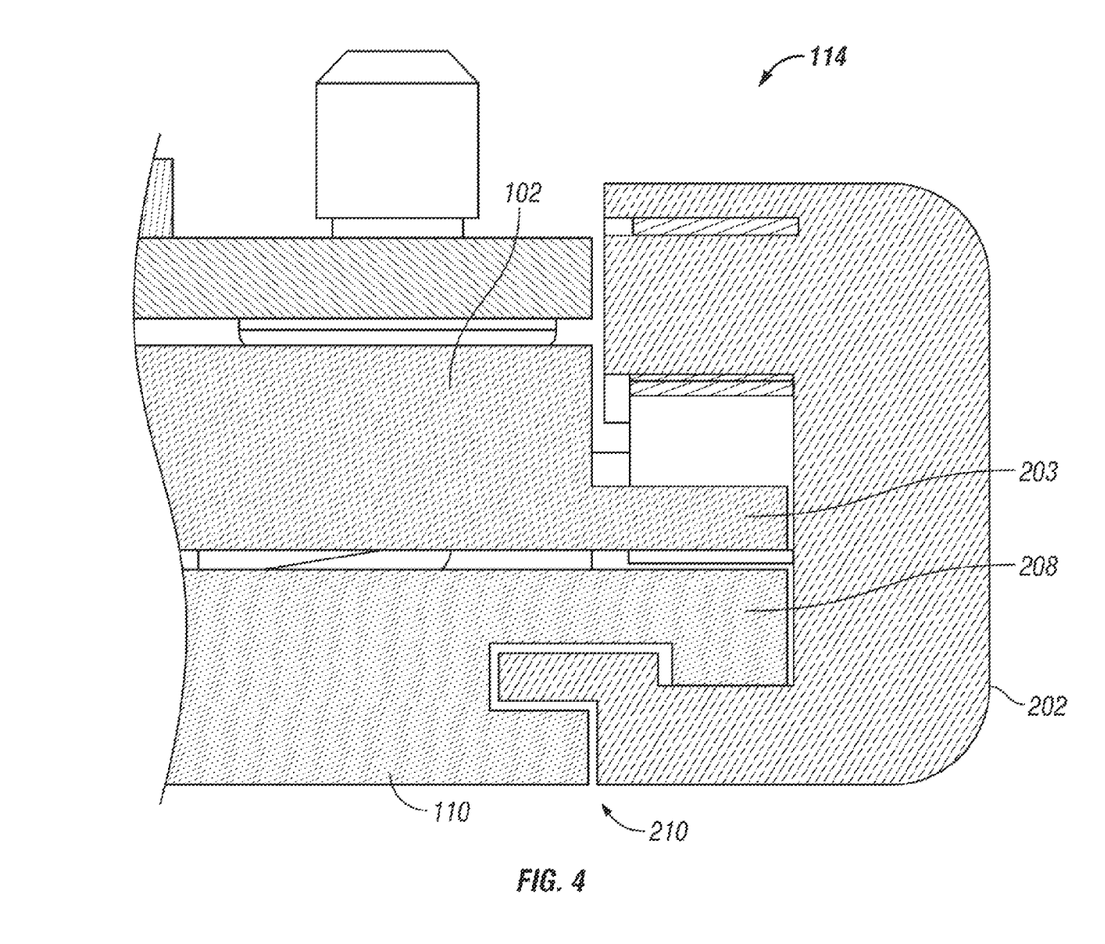
FIG. 4 is a cross-sectional view taken along line 4-4 of FIG. 3 showing one of the sliders in an engaged orientation.

FIG. 4 is a cross-sectional view taken along line 4-4 of FIG. 3 showing the sliders 202 in an engaged orientation. As shown, the sliders 202 have a C-shaped cross-section. Further, the linear track 210 maintains the sliders 202 coupled to the second thermal component 110.

Thus, in one example of use, the first thermal component 102 may be attached in thermal communication with an integrated circuit 104. Further, the second thermal component 110 may be situated in thermal communication with the first thermal component 102. Still yet, the coupler 114 may be manipulated for engaging the first thermal component 102 and the second thermal component 110, thereby affording thermal communication between the integrated circuit 104 and the heat dissipater 112.

Figure 5:
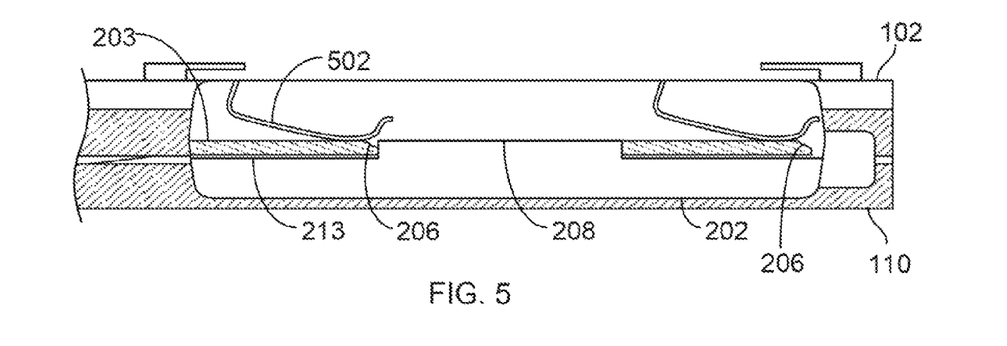
FIG. 5 is a cross-sectional view taken along line 5-5 of FIG. 3 with one of the sliders in an engaged orientation, in accordance with another embodiment.

FIG. 5 is a cross-sectional view taken along line 5-5 of FIG. 3 with one of sliders 202 positioned in an engaged orientation, in accordance with another embodiment. As shown, the sliders 202 may each include a pair of springs 502 with a first end coupled to a top face thereof and extending downwardly therefrom at an angle to define a flexible beveled edge. When sliding the sliders 202 from the first disengaged orientation to the second engaged orientation, the springs 502 may be biased in the manner shown to apply a force upon the tabs 203 of the first thermal component 102 for ensuring optimal engagement of the first thermal component 102 and the second thermal component 110.

Still yet, a second end of each of the springs 502 may be upturned in the manner shown. By this design, the second end of each of the springs 502 is adapted to engage an edge of the corresponding recess 213 formed in the elongated extensions 208 of the second thermal component 110. To this end, the sliders 202 may be maintained in the second engaged orientation.

Figure 6:
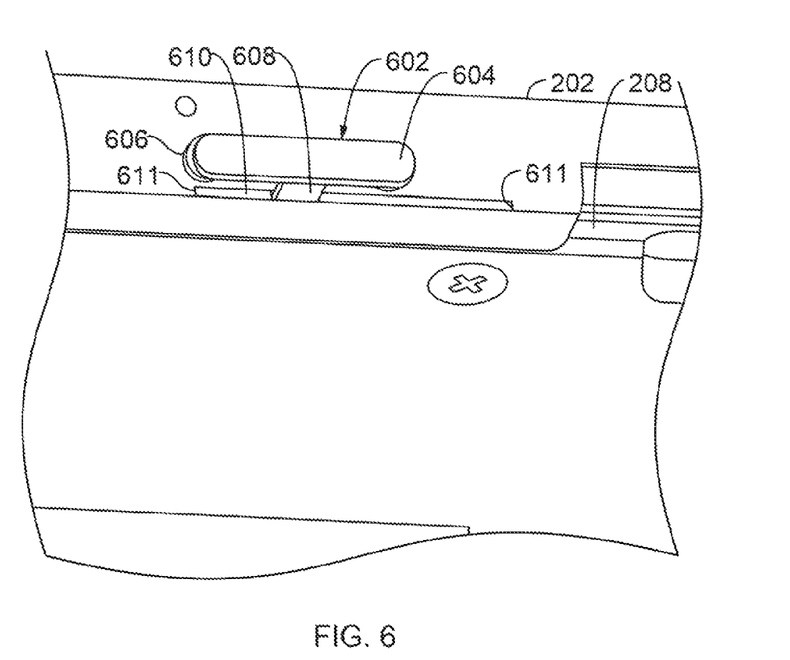
FIG. 6 is a phantom perspective view of one of sliders equipped with a locking mechanism, in accordance with another embodiment.

FIG. 6 is a phantom perspective view of one of sliders 202 equipped with a locking mechanism, in accordance with another embodiment. As shown, a lock 602 may be included for further maintaining the sliders 202 in the second engaged orientation. Such lock 602 may include an exterior portion 604 with a pair of posts (not shown) that slidably engage a pair of holes formed in the associated slider 202. Interior of the slider 202 is a pair of interior stoppers 606 which are also fixedly coupled to the posts.

To this end, the exterior portion 604 of the lock 602 may be gripped to pull the lock 602 into a first position whereby the stoppers 606 do not obstruct the sliding movement of the slider 202. Further, once the slider 202 is positioned in the second engaged orientation, the exterior portion 604 of the lock 602 may be gripped to push the lock 602 into a second position whereby the stoppers 606 are moved into engagement with any of the interior components to preclude movement of the slider 202.

As yet a further option, a member 608 may extend inwardly from the exterior portion 604 of the lock 602 (or any other portion of the slider 202, for that matter) to engage a constrained guide slot 610 (defined by forward/backward stops 611) formed in the elongated extension 208 of the second thermal component 110. To this end, the sliding movement of the slider 202 may be constrained, to prevent inadvertent removal of the slider 202 from the second thermal component 110.

Figure 7:
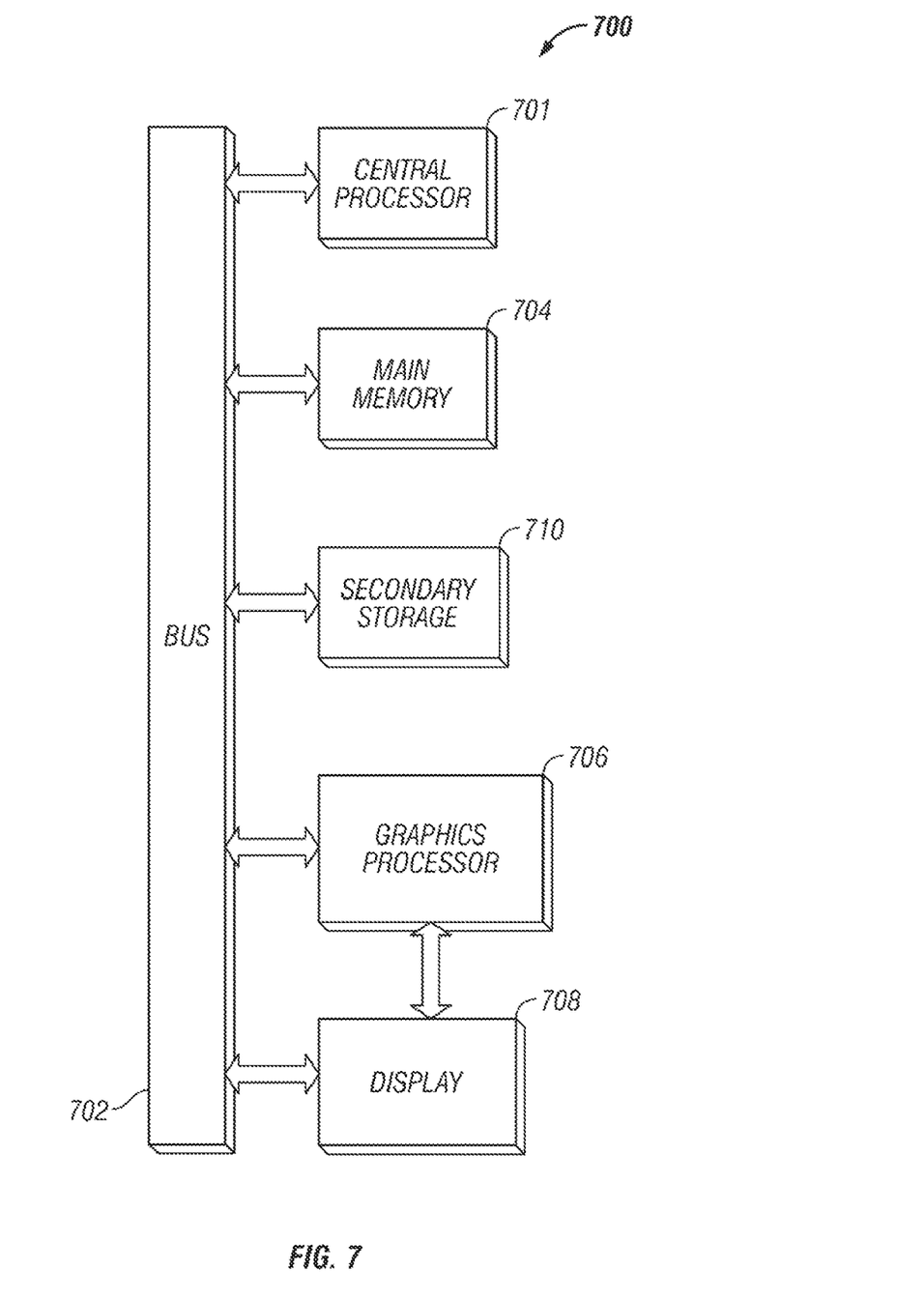
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As an option, any of the integrated circuits shown in FIG. 7 may be equipped with the system 100 of FIG. 1 for cooling purposes, etc.

As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices m including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising: a first thermal component attached to and in direct communication with the top of an integrated circuit; a second thermal component adapted for thermal communication with the first thermal component upon engagement therewith; and a coupler slidably coupled to at least one of the first thermal component and the second thermal component, with a first orientation for disengaging the first thermal component and the second thermal component, and a second orientation for engaging the first thermal component and the second thermal component.

2. The apparatus of claim 1, wherein the first thermal component includes a plate.

3. The apparatus of claim 1, wherein the second thermal component includes a plate.

4. The apparatus of claim 1, wherein the integrated circuit includes a graphics processor.

5. The apparatus of claim 1, and further comprising a heat dissipater coupled to the second thermal component.

6. The apparatus of claim 5, wherein the heat dissipater includes a passive heat dissipater.

7. The apparatus of claim 5, wherein the heat dissipater includes an active heat dissipater.

8. The apparatus of claim 1, wherein the first thermal component is coupled to a circuit board.

9. The apparatus of claim 1, wherein the coupler slides between the first orientation and the second orientation.

10. The apparatus of claim 1, wherein at least one of the first thermal component and the second thermal component include a first beveled edge, and the coupler includes a second beveled edge for engaging the first beveled edge.

11. The apparatus of claim 10, wherein the engagement of the first beveled edge and the second beveled edge forces the first thermal component and the second thermal component into engagement.

12. The apparatus of claim 1, wherein a spring is included for forcing the first thermal component and the second thermal component into engagement.

13. The apparatus of claim 1, wherein the coupler includes a substantially C-shaped cross-section.

14. The apparatus of claim 1, wherein the coupler includes a pair of sliders coupled to opposite sides of at least one of the first thermal component and the second thermal component.

15. The apparatus of claim 1, wherein the first thermal component and the second thermal component are self-aligning.

16. The apparatus of claim 15, wherein at least one of the first thermal component and the second thermal component, and the coupler includes a plurality of tabs and a plurality of slots for self-aligning the first thermal component and the second thermal component.

17. The apparatus of claim 1, wherein the coupler is movable between the first orientation and the second orientation without the use of a tool.

18. A method, comprising: attaching a first thermal component in direct communication with the top of an integrated circuit; situating a second thermal component in thermal communication with the first thermal component; and manipulating a coupler slidably coupled to at least one of the first thermal component and the second thermal component, for engaging the first thermal component and the second thermal component.

19. A system, comprising: a circuit board; an integrated circuit mounted on the circuit board; a first thermal component attached to and in direct communication with the top of an integrated circuit: a second thermal component adapted for thermal communication with the first thermal component upon engagement therewith; and a coupler slidably coupled to at least one of the first thermal component and the second thermal component, with a first orientation for disengaging the first thermal component and the second thermal component, and a second orientation for engaging the first thermal component and the second thermal component.

20. The system of claim 19, wherein the integrated circuit remains in communication with memory via a bus.

21. The apparatus of claim 1, wherein the apparatus is operable such that liquid is directly disposed between the first thermal component and the integrated circuit for facilitating the direct communication.

22. The apparatus of claim 1, wherein the apparatus is operable such that the coupler includes a pair of sliders coupled to opposite sides of the first thermal component.

23. The apparatus of claim 1, wherein the second thermal component is aligned directly above the first thermal component, upon engagement.

24. The apparatus of claim 1, wherein the first thermal component is mounted directly over the integrated circuit and is only in contact with a circuit board via a plurality of screws used to attach the first thermal component to the circuit board.

* * * * *

UNITED STATES PATENT AND TRADEMARK OFFICE
CERTIFICATE OF CORRECTION

PATENT NO. : 7,903,413 B1  Page 1 of 1
APPLICATION NO. : 11/770632
DATED : March 8, 2011
INVENTOR(S) : Wernig et al.

It is certified that error appears in the above-identified patent and that said Letters Patent is hereby corrected as shown below:

In the specification:
    Col. 1, line 36, please replace "component, in" with --component. In--;
    Col. 2, line 39, please replace "provided," with --provided--;
    Col. 2, line 41, please replace "during," with --during--;
    Col. 3, lines 3-4, please replace "component for" with --component 110 for--.

In the claims:
    Col. 6, line 51, please replace "circuit:" with --circuit;--.

Signed and Sealed this
Twenty-first Day of June, 2011

David J. Kappos
*Director of the United States Patent and Trademark Office*